Figure 1:
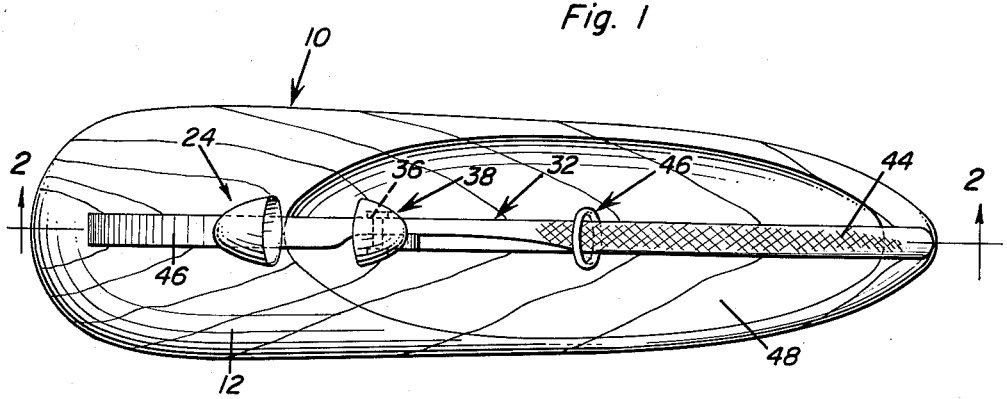

Dec. 26, 1961  D. C. LANDGRAF  3,014,514
NUTCRACKER
Filed May 17, 1960

David C. Landgraf
INVENTOR.

United States Patent Office 3,014,514
Patented Dec. 26, 1961

3,014,514
NUTCRACKER
David C. Landgraf, Rte. 1, Box 133, Madill, Okla.
Filed May 17, 1960, Ser. No. 29,740
4 Claims. (Cl. 146—13)

This invention relates to a novel and useful nutcracker, and more particularly to a nutcracker constructed in a manner providing first and second arms having confronting jaw portions thereon pivotally mounted for movement toward and away from each other and in a manner whereby the handle portions for operating the jaws are hingedly secured together and may be maintained in a predetermined position relative to each other while adjusting the distance between the jaw portions of the nutcracker so that the handle portions may assume substantially the same positions relative to each other while cracking both large and small nuts.

Although the nutcracker is specifically adapted for cracking nuts, it is to be understood that it could be used as a vise or the like for holding articles between the jaw portions thereof.

Most nutcrackers are provided with a pair of lever arms hingedly secured together having jaw portions thereon between which a nut is grasped and compressed until the shell thereof breaks while moving the handle portions toward each other. Nutcrackers heretofore have been constructed in a manner whereby the size of the nut being cracked determines the positioning of the handle portions relative to each other. This type of construction is not versatile for cracking both large and small nuts inasmuch as the handle portions may be spread wide apart while cracking a large nut and thus making it difficult to grasp both handle portions with one hand, or the handle portions may be disposed in close proximity to each other while cracking a small nut thus making further movement of the handle portions toward each other awkward.

The main object of this invention is to provide a nutcracker having handle portions for moving the jaw portions of the nutcracker toward each other, which handle portions may be maintained in a predetermined position until the jaw portions of the nutcracker have been positioned relative to each other to engage opposite sides of a nut whereupon the handle portions may then be squeezed together to crack the shell of the nut.

A further object of this invention, in accordance with the immediately preceding object, is to provide a means whereby the handle portions may be maintained in position against movement away from each other so that an object positioned between the jaw portions thereof may be held between the jaws without manually squeezing the handle portions toward each other.

A further object of this invention, in accordance with the immediately preceding object, is to provide a limit means for limiting the movement of the handle portions of the nutcracker away from each other which is removably secured to the handle portions and which may be adjusted in position to limit the movement of the handle portions away from each other beyond any predetermined distance.

Yet another object of this invention, in accordance with the preceding objects, is to provide a convenient stand for supporting the nutcracker whereby it may be positioned for instantaneous use.

A final object to be specifically enumerated herein is to provide a nutcracker which will conform to conventional forms of manufacture, be of simple construction and easy to operate so as to provide a device that will be economically feasible, long lasting and desirable.

Figure 2:
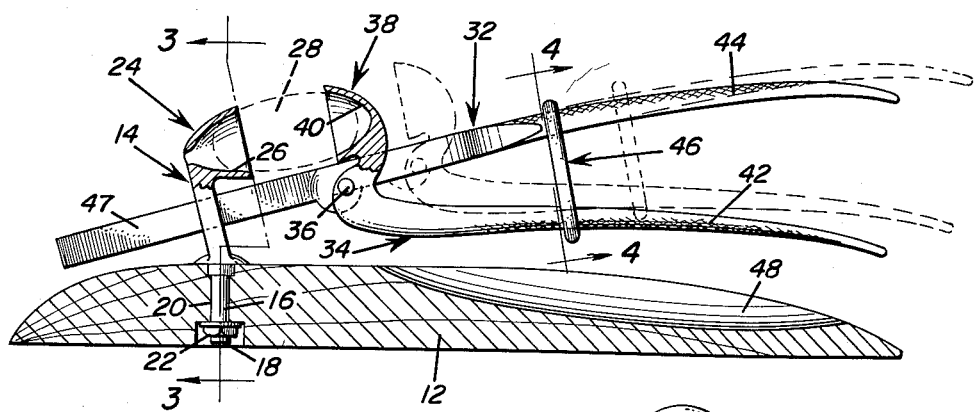
Figure 3:
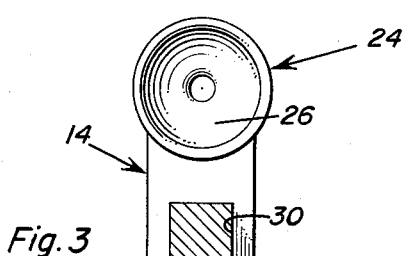
Figure 4:
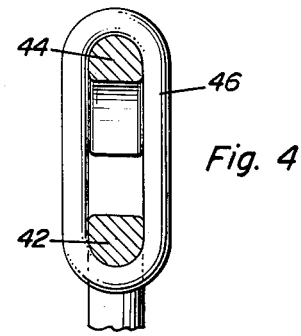
Figure 4:
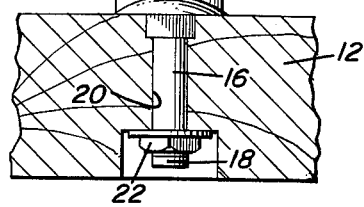

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a top plan view of the nutcracker;
FIGURE 2 is a longitudinal vertical sectional view taken substantially upon the plane indicated by the section line 2—2 of FIGURE 1;
FIGURE 3 is an enlarged vertical transverse sectional view taken substantially upon the plane indicated by the section 3—3 of FIGURE 2; and
FIGURE 4 is an enlarged vertical sectional view taken substantially upon the plane indicated by the section line 4—4 of FIGURE 2.

Referring now more specifically to the drawings the numeral 10 generally designates the nutcracker of the instant invention which includes a base 12. The nutcracker 10 has a first arm portion generally designated by the reference numeral 14 provided with a mounting shank portion 16 whose free end is threaded as at 18. The base 12 includes a vertical bore 20 through which the shank 16 is secured by means of a threaded fastener 22 to rigidly secure the arm 14 to the base 12.

The arm 14 is provided with a jaw portion generally referred to by the reference numeral 24 on its end remote from the shank 16 and the jaw portion 24 is provided with a recess 26 for engaging an end portion of a nut such as that indicated in FIGURE 2 at 28. The arm 14 includes a journal portion comprising an opening 30 formed therethrough and one end of a mounting beam generally referred to by the reference numeral 32 is snugly and slidably received through the opening 30. It will be noted that the opening 30 is non-circular in cross-section and that the end of the mounting beam slidably disposed therethrough is complementary thereto.

A second arm generally referred to by the reference numeral 34 is pivotally secured to the mounting beam 32 intermediate its ends by means of a transversely extending pivot pin 36. The arm 34 includes a jaw portion generally designated by the reference numeral 38 having a recess 40 formed therein similar to and for the same purpose as the recess 26. It is to be noted that although the jaw portions 24 and 38 have been provided with recesses 26 and 40 respectively, that these recesses actually comprise faces of the jaw members between which the nut 28 may be frictionally engaged. If it is desired, should the nutcracker 10 be used for other purposes, the confronting faces of the jaw portions 24 and 38 could have other contours suited to the articles to be held between the jaws 24 and 38.

The second arm 34 is similar to a bell crank and the jaw 38 is formed on one arm thereof and the handle portion 42 is formed on the other arm thereof. It will be noted that the handle portion 42 extends along the handle portion 44 of the mounting beam 32 so that the two handle portions 42 and 44 may be grasped and urged together to effect movement of the jaw portions 24 and 38 toward each other.

A limit means comprising a frame-like member generally designated by the reference numeral 46 slidably receives the handle portions 42 and 44 and may be slid longitudinally thereof to adjustably limit the movement of the handle portions 42 and 44 away from each other in an obvious manner.

With attention now directed more particularly to FIGURE 2 of the drawings it will be noted that sliding movement of the non-circular end portion 47 of the mounting beam 32 through the opening 30 will move the jaw portions 24 and 38 together to frictionally engage the opposite ends of a nut 28 disposed therebetween. After the jaw portions 24 and 38 have been moved to engage opposite ends of a nut, the handle portions 42 and 44 may then be manipulated and urged together to effect movement of the jaw portions 24 and 38 together to crack the nut 28 disposed therebetween. If the nut is larger than the nut 28, the mounting beam 32 may be slid through the opening 30 to a position such as that illustrated in phantom lines to enable the jaw portions 24 and 38 to frictionally engage opposite sides of the large nut while still maintaining the handle portions 42 and 44 in substantially the same positions relative to each other. Thus, it will be noted that objects varying in size may be conveniently gripped and compressed between the jaw portions 24 and 38 without greatly changing the relative positions of the handle portions 42 and 44.

It is to be noted that the jaw portions 24 and 38 are offset from the longitudinal axis of the mounting beam 32 and therefore movement of the handle portions 42 and 44 together to compress an object between the jaw portions 24 and 38 will tend to laterally deflect the handle portion 44 thereby frictionally engaging the upper and lower surfaces of the non-circular end portion 46 of the mounting beam 32 into tight frictional engagement with the corresponding surfaces of the opening 30 to thereby hold the mounting beam 32 in adjusted position relative to the arm 14.

In order to reduce the overall height of the nutcracker 10, the handle portion 42 is disposed in close overlying relation to the adjacent portion of the base 12 which is provided with a suitable recess 48 directly beneath the handle portion 42 to provide additional clearance between the base 12 and the handle portion 42.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A nutcracker comprising an elongated base, a first arm having one end rigidly secured to one end of said base with the other end projecting laterally and upwardly from said base and longitudinally thereof, said first arm including a terminal end jaw portion defining a face adapted to engage one side of an object and facing toward the other end of said base, said first arm including a journal portion defining an opening generally paralleling said base and being non-circular in cross-section, an elongated mounting beam having one end portion with a cross-section complementary to and snugly and slidably received in said opening, the other end of said beam comprising a first handle portion, a second generally L-shaped arm having first and second substantially right angled short and long legs respectively joined together at adjacent ends to form an apex, means pivotally securing the apex portion of said second arm to said first arm intermediate its opposite ends for movement about an axis extending transversely of said first arm and of the plane in which said second arm is disposed, said short leg including a free end portion defining a jaw having a face opposing said first mentioned face and adapted to engage the side of an object remote from said first mentioned face, said long leg defining a second handle portion generally paralleling said first handle portion and spaced laterally therefrom and disposed on the side thereof remote from said jaw portions, said base being of a length to extend beneath said handle portions and to thereby prevent tilting of the nutcracker when said first handle portion is urged downwardly relative to said base.

2. The combination of claim 1 including limit means secured between said remote end portion of said second arm and said other end of said mounting beam for adjustably limiting the movement of the remote end portion of said second arm away from said other end of said mounting beam.

3. The combination of claim 2 wherein said limit means is removably secured to said first and second handle portions.

4. The combination of claim 3 wherein said limit means comprises a frame-like member slidably receiving said second arm and said mounting beam.

References Cited in the file of this patent

UNITED STATES PATENTS

| | | |
|---|---|---|
| 1,254,119 | Chamberlain et al. | Jan. 22, 1918 |
| 1,380,044 | Davis | May 31, 1921 |
| 1,560,349 | Schweitzer | Nov. 3, 1925 |

FOREIGN PATENTS

| | | |
|---|---|---|
| 492,729 | Canada | May 12, 1953 |